(12) United States Patent
Klein (10) Patent No.: US 7,428,191 B1
(45) Date of Patent: Sep. 23, 2008

(54) ELECTRONIC TIMEPIECE WITH INVERTED DIGITAL DISPLAY

(76) Inventor: Dennis L. Klein, 2800 Placida Rd., Suite 103, Englewood, FL (US) 34224

( * ) Notice: Subject to any disclaimer, the term of this patent is extended or adjusted under 35 U.S.C. 154(b) by 72 days.

(21) Appl. No.: 11/416,300

(22) Filed: May 1, 2006

(51) Int. Cl.
*G09B 19/12* (2006.01)
(52) U.S. Cl. .......................................... 368/82; 368/223
(58) Field of Classification Search .................. 368/82, 368/223, 83, 84, 239, 241, 242, 69, 296
See application file for complete search history.

(56) References Cited

U.S. PATENT DOCUMENTS

| | | |
|---|---|---|
| 3,576,099 A | 4/1971 | Walton |
| 3,613,351 A | 10/1971 | Walton |
| 3,742,699 A | 7/1973 | Bergey |
| 3,759,031 A | 9/1973 | McCullough et al. |
| 3,803,827 A | 4/1974 | Roberts |
| 3,955,356 A | 5/1976 | LeCocq |
| 4,048,796 A | 9/1977 | Sasaki |
| 4,106,277 A | 8/1978 | Garrison et al. |
| 4,747,086 A | 5/1988 | Shaw |
| 6,525,997 B1 * | 2/2003 | Narayanaswami et al. .. 368/223 |
| 6,966,779 B1 * | 11/2005 | Bachelor ..................... 434/304 |
| 2004/0156270 A1 * | 8/2004 | Weng .......................... 368/82 |

* cited by examiner

*Primary Examiner*—Gary F. Paumen
(74) *Attorney, Agent, or Firm*—Charles J. Prescott (57) ABSTRACT

An electronic timepiece including a hollow casing, an electronic L.E.D. module disposed in the casing, the module including a digital time and date display. A glass crystal is connected into an open bezel of the casing and covers the module and the display. By selective manual finger contact with the casing, the display is preferably orientable for reading alternately from either side of the timepiece by the wearer or by an observer. An illuminated image projection separate from the display preferably emanates from a top surface of the casing adjacent the crystal. Preferred first and second touch command bars extend around a different portion of a perimeter of the crystal wherein, when manually touched, current time or current calendar information is displayed. A thin film lamination may be attached atop the module or on an inner surface of the crystal for color enhancement of the display.

9 Claims, 7 Drawing Sheets

ELECTRONIC TIMEPIECE WITH INVERTED DIGITAL DISPLAY

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This Invention relates generally to an improved timepiece or wristwatch. More specifically, the invention relates to an electronic timepiece incorporating an L.E.D. or L.C.D. display with digital readout.

2. Description of Related Art

Presently there are a wide variety of electronic timepieces utilizing light emitting diode (L.E.D.) an/or liquid crystal display (L.C.D.) elements for digital readout. Many advantages and disadvantages to L.E.D. and L.C.D. timepieces are well described in U.S. Pat. No. 4,747,086. Some early timepiece examples are disclosed in U.S. Pat. Nos. 3,576,099 and 3,613,351 describing both typical L.E.D. and L.C.D. digital readout types. In contrast to a conventional analog type, these electronic digital timepieces display information in the form of numbers or digits and are well known in the art. L.C.D. timepieces have a continuous readout while due to power consumption, L.E.D. timepieces can only display readouts on demand.

Early L.E.D. timepieces utilized a mechanical command button assembly incorporated in the watchcase to be pushed by the wearer for readout activation. U.S. Pat. No. 3,759,031 discloses elements for commanding the electronics to display the digital readout (time only) utilizing a single mechanical push button. The initial time settings are accomplished and maintained by means of a magnetically actuated internal reed switch incorporated on the electronic module from outside the watchcase with a magnet. The magnet is conveniently stored in a compartment incorporated in the clasp of the bracelet.

An advanced electronic digital timepiece incorporating both time and calendar information is disclosed in U.S. Pat. No. 3,803,827, time and calendar information can be independently displayed by means of two separate mechanical push button assemblies. Advanced setting features disclosed in U.S. Pat. No. 4,106,277 show the same two separate buttons used to demand readouts for time or calendar information could be used in the setting mode by sequential button depression. This is known in the art as Auto-Setting (AS).

Yet another advancement to the L.E.D. electronic timepiece disclosed in U.S. Pat. No. 3,742,699 incorporates an arm responsive inertial switch on the internal electronic module for demanding the time readout to be displayed without depressing buttons. The wearer performs a predetermined series of wrist movements to activate the switch. This is known in the art as an Auto-Command (AC) feature. Another AC version is disclosed in U.S. Pat. No. 3,955,356 describing a gravity-actuated demand switch. By positioning the watch while on the wrist to a selected orientation range from horizontal, for example 30 degrees, digital readout is activated. When the wearer lifts his/her arm to view the display the gravity-actuated switch signals the integrated circuit (IC) to display a digital readout.

A more recent advanced L.E.D. timepiece disclosed in U.S. Pat. No. 4,048,796 is an electronic timepiece with the top portion of the watchcase isolated from the lower case to create a switch assembly for commanding readouts without the use of any buttons. By unitizing touch sensitive electronic circuitry, touching any area on the top of the watchcase completes the loop circuit with the lower watchcase section and commands readout. This is known in the art as Touch-Command (TC).

Also well known to the art is that typically an electronic L.E.D. timepiece has a colored watch crystal of corresponding color to the output L.E.D. display positioned on the electronic module. Commonly a colored mineral glass or plastic crystal to view the L.E.D. digital display from outside the watchcase is unutilized. It is essential the colored crystal allow the proper wavelength of colored light to pass through to the outside while blocking from view any components inside the watchcase under the crystal.

U.S. Pat. No. 4,747,086 discloses an improved watch crystal to view a L.E.D. readout of any color by coating the backside of the crystal with mercury. This method transforms a clear uncolored watch crystal into a mirror until the L.E.D. readout is displayed. If in addition, a color is desired a separate film could be applied to the backside of the crystal after the mercury is applied. Also disclosed is the possibility of a color tint film applied without the mercury application. No methods of application are discussed in the disclosure of invention.

The present invention in one aspect thereof allows for the option to command the digital readout into an inverted position. The inversion provides considerable improvement in the orientation of the digital readout for viewing by an observer and eliminates the need for the wearer to contort his/her wrist. While in the typical operating mode, the digital readout is orientated for viewing by the wearer until the inverted display feature is activated.

BRIEF SUMMARY OF THE INVENTION

This invention is directed to an electronic timepiece including a hollow casing, an electronic L.E.D. module disposed in the casing, the module including a digital time and date display. A glass, preferably clear cultured sapphire crystal, is connected into an open bezel of the watch casing and covers the module and the display. An illuminated image projection separate from the display preferably emanates from a top surface of the casing adjacent the crystal. Preferred first and second touch command bars extend around a different portion of a perimeter of the crystal wherein, when manually touched, current time or current calendar information is displayed. By selective manual finger contact with the casing, the display is preferably orientable for reading alternately from either side of the timepiece by the wearer or by an observer. A thin film lamination may be attached atop the module or on an inner surface of the crystal for color enhancement of the display and crystal.

It is therefore an object of the present invention is to provide an option to invert the L.E.D. or L.C.D. digital readout (digital display) incorporated in the workings of an electronic timepiece.

Another aspect of the present invention is an independent illuminated image formed into the watch casing to be viewed separately or additionally to the main display readout.

Yet another object of the present invention is an improved touch-sensitive touch command assembly with multiple touch areas for commanding time, calendar, setting, and inversion functions.

And still yet another object of the present invention is to utilize the application of a film of color and/or special effect to the face of an electronic module or to the inner surface of the crystal to give aesthetic value to the watch crystal whether the L.E.D. readout is displayed or not. Additionally, an improved method of applying such film to the backside of a watch crystal or to the face of the electronic module for color enhancement and/or special effects is provided.

In accordance with these and other objects which will become apparent hereinafter, the instant invention will now be described with reference to the accompanying drawings.

DETAILED DESCRIPTION OF THE INVENTION

Referring now to the drawings, the preferred embodiment of the invention is there shown generally at numeral 10 and includes a timepiece assembly 12 and a watchband assembly 14 connected thereto in typical operative arrangement. The timepiece 10 includes a formed or machined casing 16, a preferably flat clear sapphire crystal 18, an electronic preferably L.E.D. actuated timepiece module 50 and a case back 58.

The module 50 includes IC programming to maintain the time of day and the date information and, upon proper activation to display same by an internal power source via L.E.D. readouts or segmentation at 52. A separate image 54 is also formed preferably of L.E.D. segments and may be illuminated to form a separate decorative image thru the case as will be described more fully herebelow.

The crystal 18 is seated within a bezel 62 and is surrounded by two conductive elongated contoured command bars 22 and 24. Plastic isolator strips or plates 30 and 32 are positioned between the command bars 22 and 24 and the periphery of the open outwardly facing top side of the casing 16.

A thin layer of laminate 16 of the proper color and wavelength matching the color of the selected L.E.D. display is adhered either to the upwardly facing surface at 46a of the electronic time module 50 or to the inner surface of the crystal 18 at 46. In either position, the light produced by the selective colored L.E.D.s 52 is not altered significantly. Objectively, the color of the watch crystal is changed by the application of the film allowing the selected L.E.D. color to pass through the colored watch crystal unchanged. The film laminate 46 or 46a enhances the appearance of the timepiece and display by adding color to the watch crystal while reducing visibility of components below the surface of the crystal 18 or below the surface of the electronic module 50.

The command bars 22 and 24 are elongated contoured conductive strips configured to substantially follow the perimeter profile of the crystal 18. These command bars 22 and 24 are provided to control the operation of the timepiece 12 and the IC within module 50. These command bars 22 and 24 rest atop non-conductive plastic insulator strips or plates 30 and 32 which are configured to substantially match the plan or contact profile of each of the corresponding command bars 22 and 24. These insulator plates 30 and 32 themselves rest atop the perimeter facing surfaces of the casing 16 such that the conductive command bars 22 and 24 are in electrical isolation one from another and from the casing 16.

Upwardly extending false command bars or spacing tabs 26 and 28 are formed into the casing 16 and correspond to the spacing between end tabs 34 and 36 of the isolator plates 30 and 32. These tabs 34 and 36 maintain the electrical isolation between the corresponding ends of the command bars 22 and 24. The isolator plates 30 and 32 include downwardly extending alignment pins 38 and 40 which interengage with holes 42 and 44 formed into the casing 16. When the timepiece is assembled, isolating plastic sleeves 17 positioned through apertures 19 and 21, isolate the conductive springs 15 while allowing the ends to make contact with the command bars 22 and 24 and the touch sensor circuitry contacts 64 and 66, respectively, on the electronic module 50.

A plastic imaging plug 56 is positioned between and in alignment and registry with the image L.E.D. 54 and mating apertures 20 formed through the casing 16. This image plug 56 may be clear or colored and transparent or translucent as design aesthetics dictate and is generally configured in the preferred embodiment shown to present a logo associated with the timepiece 10 itself. However, the configuration of the image 20 and the corresponding configuration of the image plug 56 and image L.E.D. 54, all of which must be in alignment and registry one to another, may be of any desired configuration, color, ornamentality or aesthetics as desired.

In previous digital timepieces, a display is programmed to be orientated for viewing only by the wearer unless the wearer turns or twists his/her arm to a position that an observer can view the display. The present invention allows for the digital display 52 to be inverted by appropriate activation by the wearer or an observer. Programming incorporated on the IC signals the digits of the module 50 to invert upside down when activated. This is accomplished by designated switching on the watchcase for inversion. Once activated, the digital display 52 is correctly orientated for viewing by the observer. The present invention 10 has two separate inversion switches in the form of the adjacent ends of the command bars 22 and 24, one for the wearer and one for the observer to activate as will be described herebelow. Orientation of each switch is located nearest to the respective parties to eliminate the display 52 being blocked by the hand of the activator. Part or all information could be displayed while inverted by alternative IC programming but the present invention inverts only the time.

Illuminated Image in Casing

The image 20 may be formed through the casing 16 by cutting, drilling, casting or any other means into the watchcase. The image 20 may also be of any shape, size or color and located anywhere on the watch casing 16. Illumination of the image L.E.D. 54 may be constant or intermittent and of any color, brightness or intensity. The present invention has Logic IC programming for setting a specific timed flash illumination period, which is controlled on the main IC and may be set by the manufacture or end user. The present invention also has IC programming to optionally turn off the illumination permanently or at predetermined time period.

Whereas a formed image 20 for additional information may implement additional time or calendar information, the present invention preferably implements a logo to promote the Watch Company. It is foreseeable that most any type of image could be unutilized for most any reason. The use of a separate clear or colored lens or crystal may also be utilized to present the image color. The illumination from the main L.E.D. display 52 may alternately include the independent formed image. However, it is preferred that the separate L.E.D. 54 for illumination be used.

Touch-Sensitive Command Bar

The present invention utilizes touch sensitive command bars 22 and 24 as above described to activate all display information. The electronic module incorporates IC programming and sensor circuitry connected to the command bars 22 and 24. The use of mechanical buttons for both command and setting functions are eliminated. All penetrations in the watchcase for the utilization of mechanical buttons are eliminated as well. Two separate command bars 22 and 24 are each for selected functions such as demanding time, calendar information or inversion, for example, by touching the right side command bar 22 for time and the left side command bar 24 for calendar Information.

Figure 11:
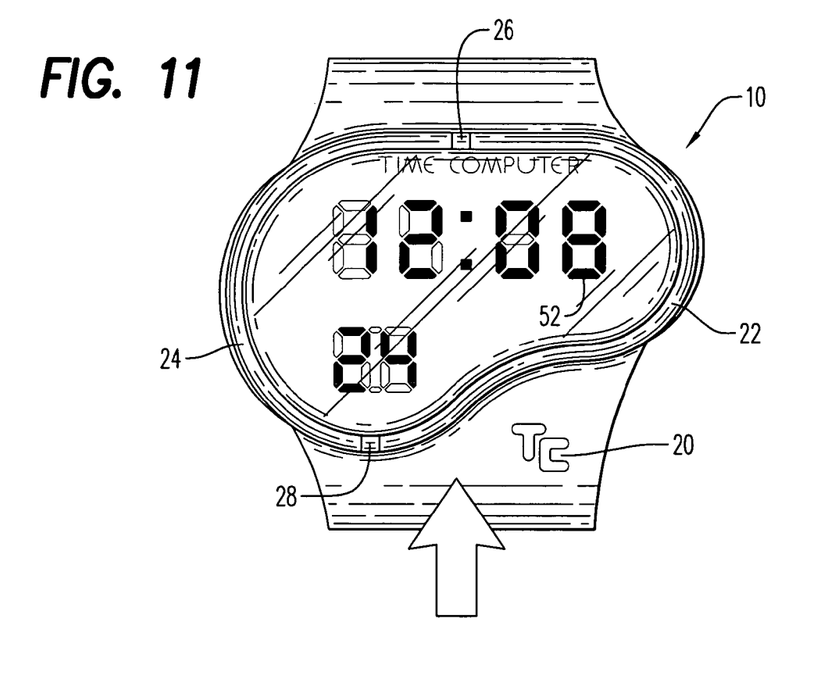
FIG. 11 is a view similar to FIG. 4 showing the alphanumeric orientation facing the wearer.
Figure 12:
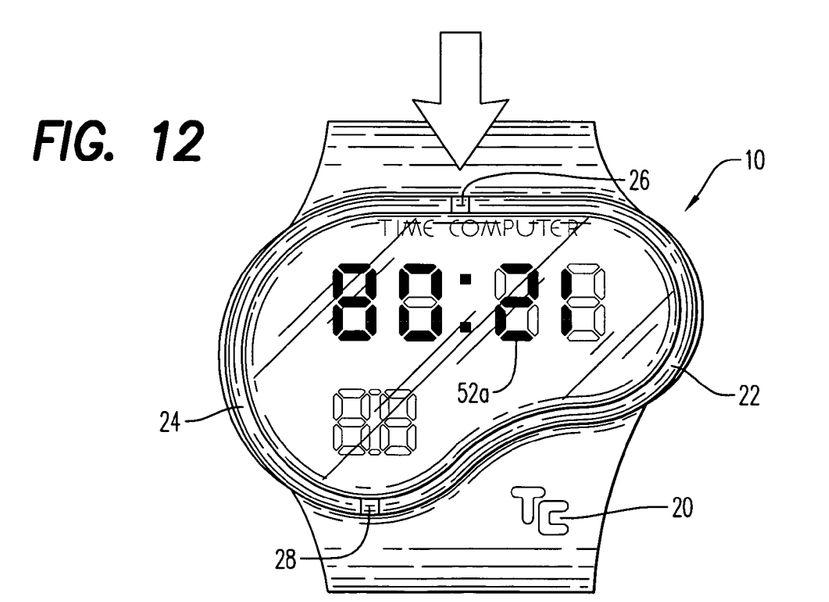
FIG. 12 is a view similar to FIG. 11 showing the alphanumeric characters inverted or reversed for proper viewing by another person.

As seen in FIG. 11, the normal orientation of the alphanumeric characters of the L.E.D. display 52 are oriented so that the wearer will view them in the direction of the arrow in an upright orientation. When both bars 22 and 24 are touched simultaneously in close proximity to spacing to tabs 26 and 28, the inversion function is activated to invert the L.E.D. display 52 so that another person may view the L.E.D. display 52 in an upright orientation from the direction of the arrow. These spacing tabs 26 and 28 gives the appearance of a third and a fourth command bar but this is a faux. These apparent command bars 26 and 28 are narrowly sized in width and positioned to force one's fingertip to make simultaneous contact with the adjacent ends of both command bars 22 and 24 and the casing 16 when touched, activating the inversion feature. Sequential touching of these same two separate command bars 22 and 24 also controls all setting functions.

In the previous referenced U.S. Pat. No. 4,048,796, the entire top portion of the watchcase is utilized to command the time and calendar information. That prior invention indicates that one touch of the top portion of the watchcase will display the time and twice to display the calendar information. It should be noted that no possible combination of touching a single electrode could allow for any setting functions. Therefore, a second electrode or a mechanical button incorporated in the watchcase is necessary for setting functions and additional functions. Also discussed in this prior referenced '796 patent is the utilization of a "bezel" used to hold the watch crystal in place as an alternative touch sensitive electrode with the same basic functions as the isolated case top electrode of the watch casing 16. There is no mention of how the end user is to set the time or calendar information with either claim utilizing one switching circuit.

In the present invention 10, all module functions are controlled with the touching of the two separate command bars 22 and 24; no additional buttons and/or bars are needed. Many combinations exist for alternative programming for various functions utilizing two command bars versus one. This arrangement also eliminates the need for a simple grounding loop circuitry used in the previous referenced '796 invention. This reduces the chance of unwanted demands. for display information due to shorting out the loop circuitry. Water or conductive matter can make contact across the small thin areas isolating the upper and lower case section of the '796 invention, shorting out the switching circuit. Such a short would signal a demand for display information. In certain instances the short could render this prior art '796 timepiece inoperable for some time until the short was resolved. An example would be a single drop of water bridging the two isolated case parts, creating the short until the drop of water was removed or evaporated the electronic module would recognize it as a command for display.

In the present invention, the right (time) and left (date) command bars 22 and 24, act as a switch signaling the sensory circuit in module 50 when touched with a human finger. Prongs or probes 38 and 40 isolated from the watch casing 16 are connected to the insulator plates 30 and 32 and the touch sensory circuit on the electronic module. The sensory circuit consists of a specific fixed resonation frequency range that, when sensed, signals for display. By utilizing the frequency range of the human finger, the need for a typical loop grounding circuit is eliminated. Since water and all other matter have a different frequency range, only the human finger can signal demands for time, calendar or inversion display readout.

Circuitry

Figure 1:
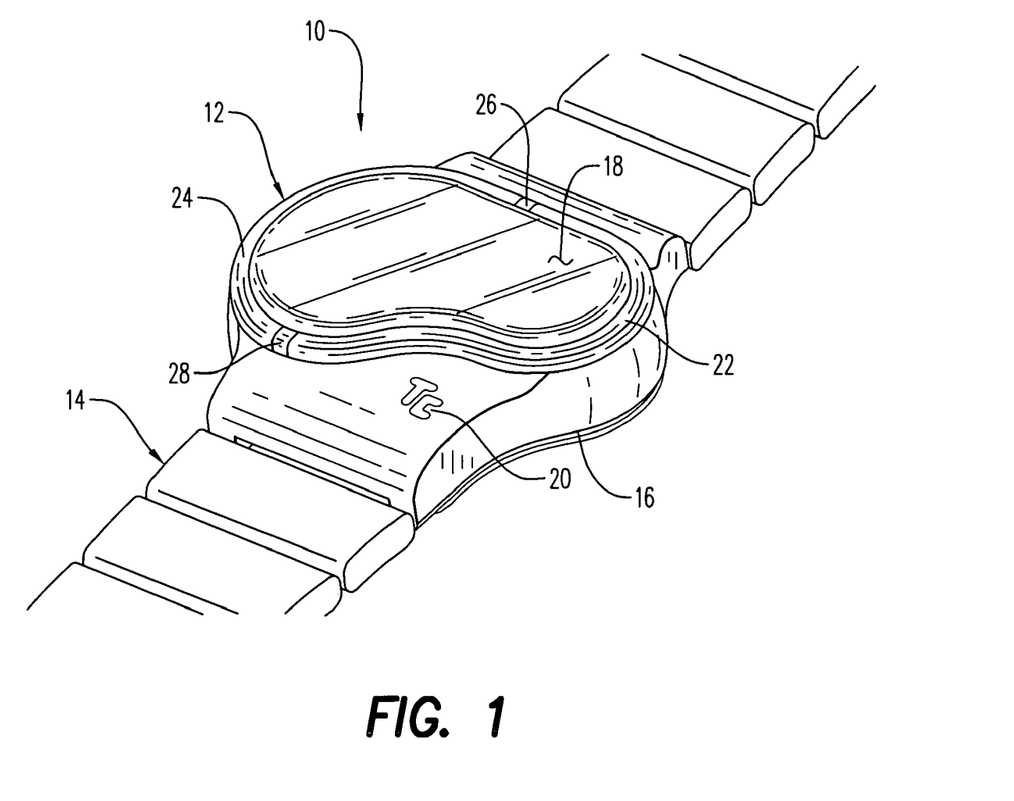
FIG. 1 is a perspective view of the invention including a watchband
Figure 2:
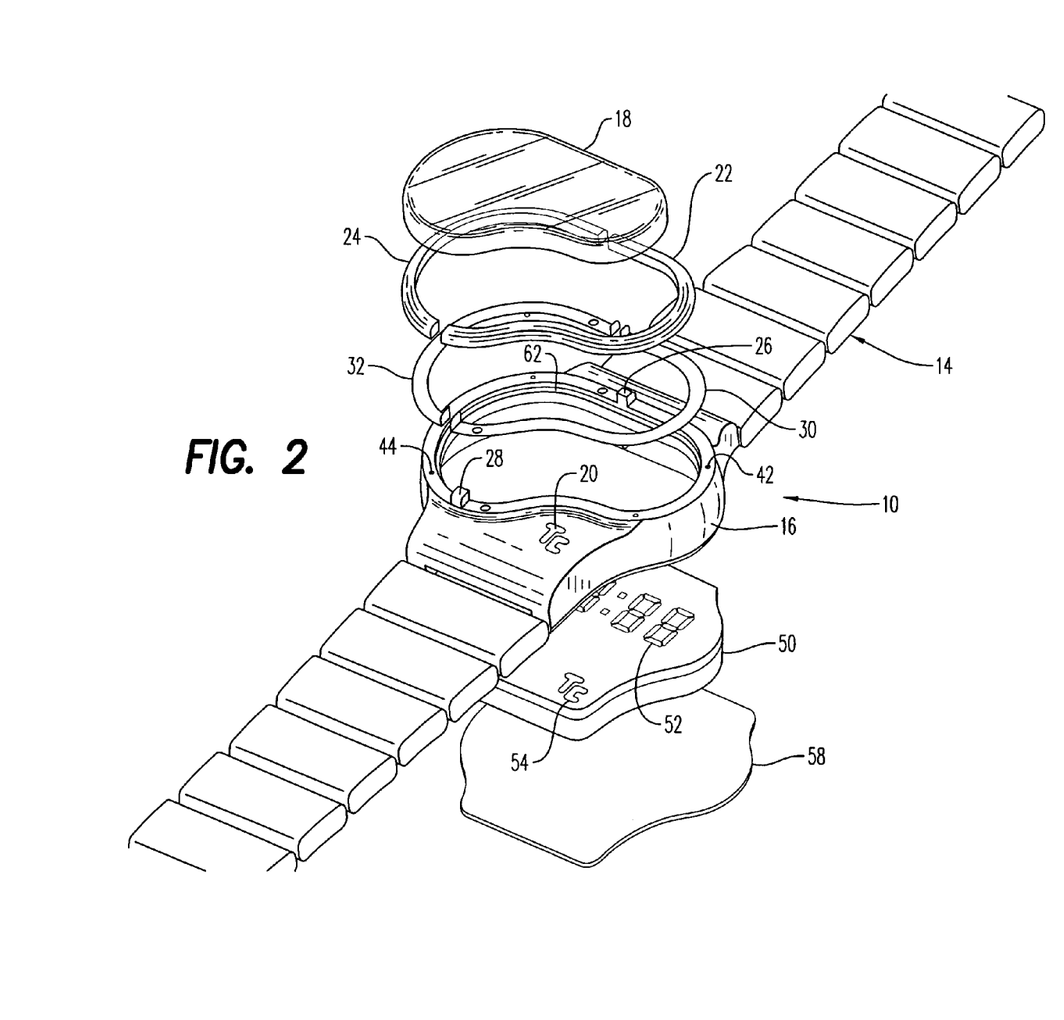
FIG. 2 is an exploded perspective view of FIG. 1.
Figure 3:
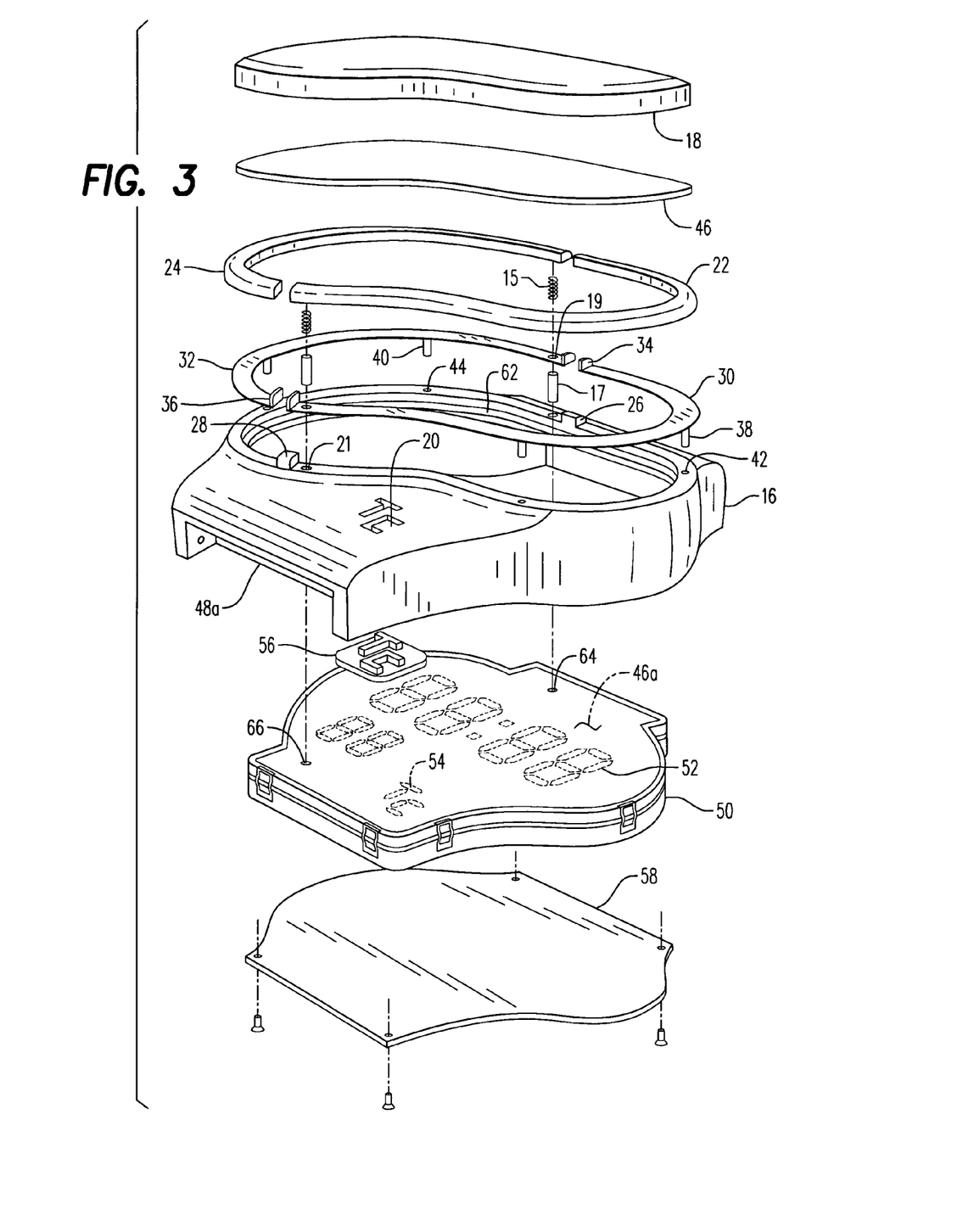
FIG. 3 is another exploded view of the timepiece only.
Figure 4:
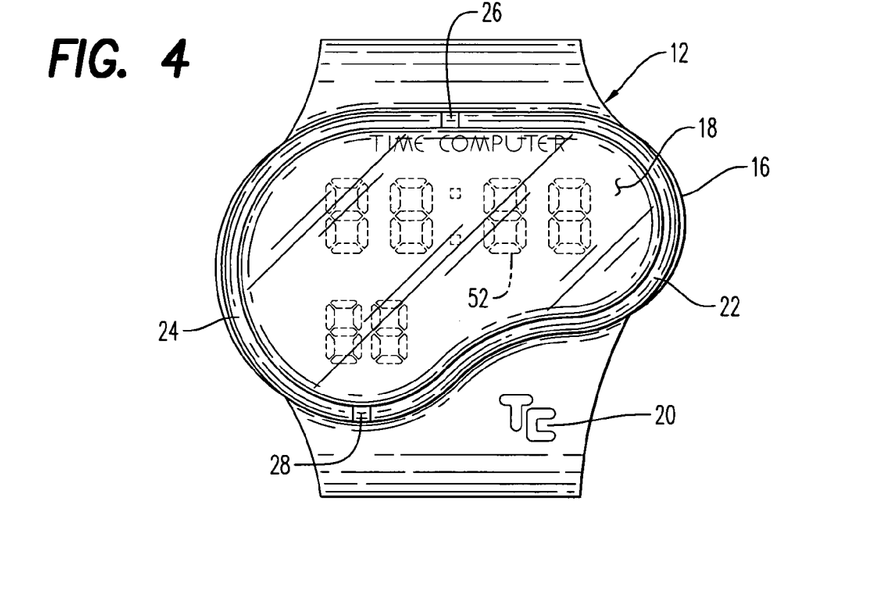
FIG. 4 is a top plan view of the timepiece.
Figure 5:
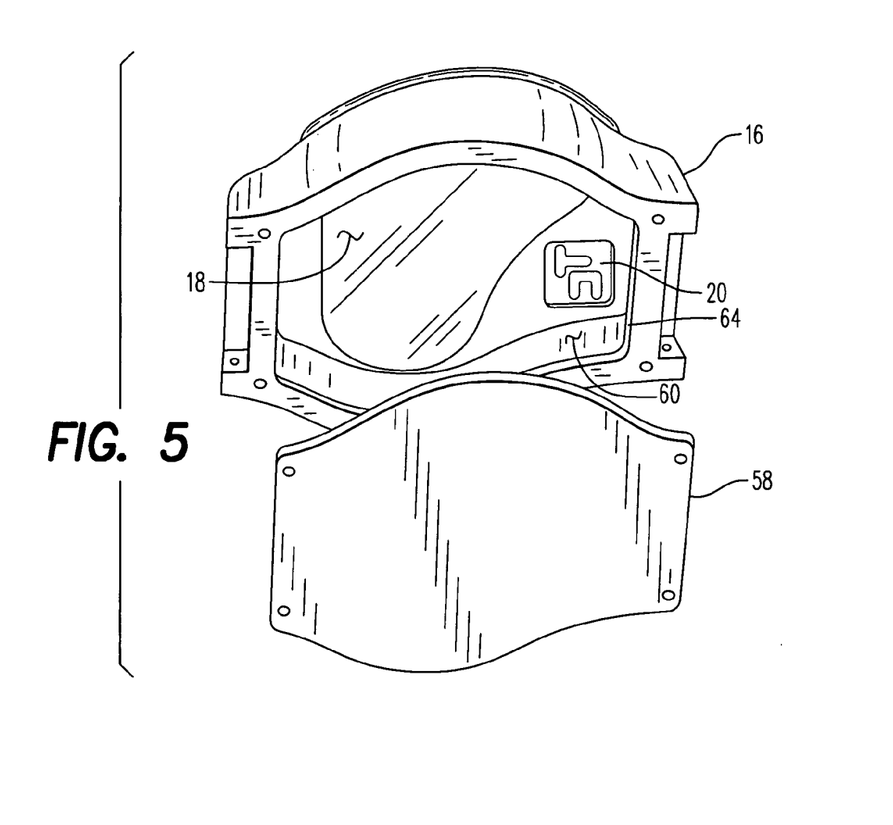
FIG. 5 is an exploded lower perspective view showing the casing, crystal and back plate.
Figure 6:
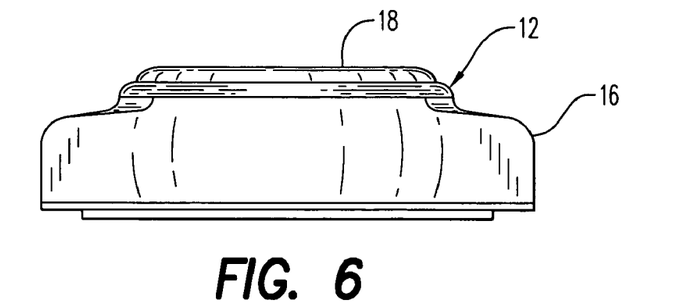
FIG. 6 is a left side elevation view of FIG. 4.
Figure 7:
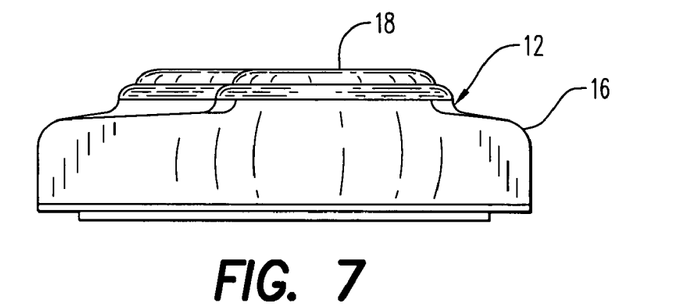
FIG. 7 is a right side elevation view of FIG. 4.
Figure 8:
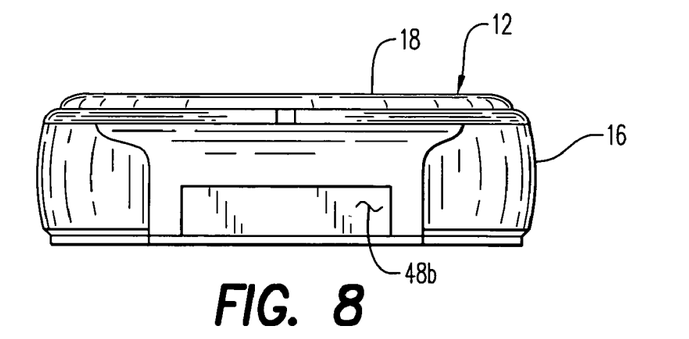
FIG. 8 is one end elevation view of FIG. 4.
Figure 9:
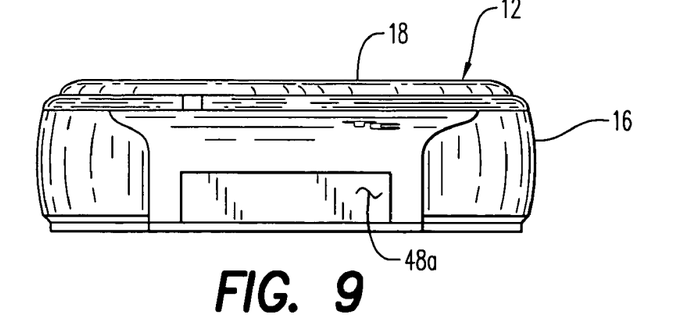
FIG. 9 is another top end view of FIG. 4.
Figure 10:
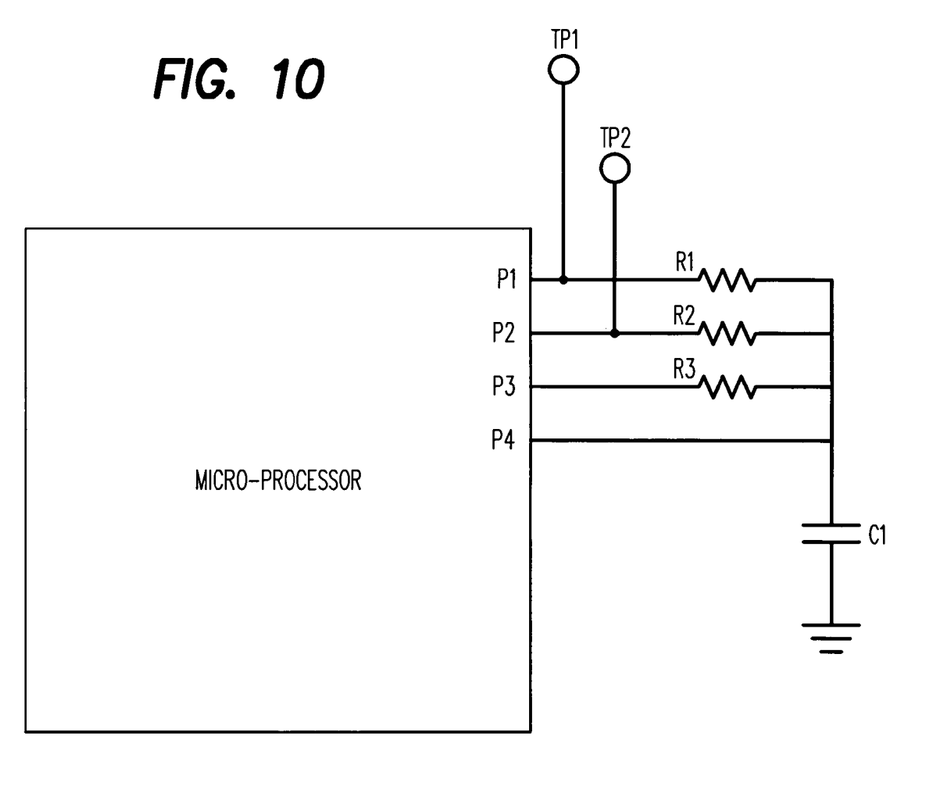
FIG. 10 is a simplified schematic drawing of the touch command circuitry.

Referring now to FIG. 10, the general description of a resistance-capacitance (R/C) electronic circuit or network is there shown for use in conjunction with the touch command features of the present invention. In this diagram of FIG. 10, the metal probes previously described are there shown at TP1 and TP2. Probe TP1 is designated for use with the left-hand touch command bar 24 while the probe TP2 is used in conjunction with the right-hand touch command bar 22.

On the microprocessor or IC, port P1 is used to supply an electric charge to the R/C network R1/C1; port 2 is used to supply an electric charge to the R/C network R2/C1; port P3 is used to supply an electric charge to the R/C network R3/C1; and port P4 is used as an input port which detects the input frequency from R1/C1, R2/C1 and R3/C1. Thus, three different R/C networks are provided each of which has its own resonant frequency.

The theory of operation is quite simple and may be explained as follows:

A first R/C oscillation network is formed by R1/C1 having a resonant frequency of:

$$F1 = \frac{1}{2}\pi [R1C1]^{1/2}$$

and is generated by electrical charging from P1. This frequency F1 will be changed if there is a very high impedance object conducted on TP1.

A second R/C oscillation network is formed by R2/C1 having a resonant frequency of:

$$F2 = \frac{1}{2}\pi [R2C2]^{1/2}$$

and is generated by electrical charging from P2. This frequency F2 will be changed if there is a very high impedance object conducted on TP2.

A third R/C oscillation network is formed by R3/C1 having a resonant frequency of:

$$F3 = \frac{1}{2\pi}[R3C3]^{1/2}$$

and is generated by electrical charging from P3. This frequency F3 will always be constant. This is "normal" and is used as a reference frequency to compare with F1 and F2 which, if different from F3, causes the processor to determine which network is different and signals that network to activate it's predetermined command.

The operational steps are as follows:
1. Supply an electric charge from P1, P2, P3 to each R/C network, R1C1, R2C1 and R3C1 separately;
2. Constantly monitor frequency input from P4;
3. Constantly monitor and compare F1 and F3; if there is a change from the predetermined resonance range, command bar TP1 is activated, i.e. "date".
4. Constantly monitor and compare F2 and F3; if there is a change from the predetermined resonance range, command bar TP2 is activated, i.e. "time".

The human body has a very high impedance compared to other conductive matter. Under 5vdc voltage, this circuit of FIG. 10 works if there is a high impedance object that comes in contact with any of the R/C networks. When one or more of the R/C networks sense a change in the frequency output of F1 and F2, the network acts as a very large resistor connected to the network. However, if the command bars TP1 and/or TP2 come in contact with conductive liquids such as water, there will be no change in resonance due to the low impedance. Therefore, no signal for command is given and the display remains normal, in the off position.

Film Lamination

The present invention provides for an even more improved digital watch by preferably economically enhancing the digital L.E.D. display and blocking visible inner watch components viewed by the outside. The appearance of the watch 10 is improved by converting a plain watch face into one of color and/or special effect such as mirror. This is achieved by applying a self-adhesive film 46a of color and/or special effect to the face of the electronic module. A similar effect is achieved if a film 46 was applied directly to the back of the watch crystal 18 but this application is more problematic. Films of this nature are readily available and commonly used in tinting applications for windows in buildings and automobiles. The film can also be applied to any flat smooth surface inside the watch visible through any clear watch crystal.

When applied to the face of the electronic module 50, printing on the exposed surface of the film is also possible and may eliminate costly reverse printing on the back of watch crystal 18. The printing would be below the surface of the watch crystal 18 and would be protected against damage and wear typical of printing on the exposed surface of the watch crystal 18.

The present invention is particularly advantageous when a sapphire crystal 18 is utilized. The high cost of growing a colored synthetic sapphire is eliminated because the desired color and/or special effect, such as mirror, can be attained utilizing film lamination. The hardness of a synthetic sapphire crystal 18 prevents successful printing on either side. By utilizing preprinted film laminated to the electronic module 50, a digital L.E.D. watch may now incorporate a sapphire crystal 18 with printing features never previously possible.

The electronic module 50 incorporated inside the watch casing preferably includes semi-transparent prismatic layer (not shown) used to spread illumination from one L.E.D. to a wider area. This improvement in L.E.D. module technology is well known in the art. By adding the film 46a laminated to the top exposed surface of the prismatic layer, when seen from the outside, the module components are not seen and the color of the film 46a is visible through the clear optical crystal 18. When the L.E.D. display 52 is activated, the L.E.D. illumination is clearly visible through the film 46a and is the only visible element other than the film color.

Film Lamination Process

The steps of the film application process are to first immerse the crystal 18, prismatic surface of module 50, or any other surface in water with the film 46 or 46a. Then, remove the backing layer that protects the adhesive and apply it to the crystal 18, prismatic surface or other surface while still immersed. Remove and force any water from between the two surfaces along with any air bubbles by conventional means described by the film manufacture. This method substantially reduces the cost by eliminating the process recommended by the manufacture to laminate in a "Clean Room" environment. Immersing significantly reduces the chance of trapping dust or foreign matter during lamination.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

The invention claimed is:

1. An electronic timepiece comprising:
  a hollow casing;
  an electronic L.E.D. module disposed in said casing and including a digital time and date display;
  a glass crystal connected into an open bezel of said casing and covering said module and said display;
  wherein, by selective finger contact with said casing by a wearer or another person facing the wearer, said display may be oriented for alternate reading from either side of said timepiece by the wearer or the other person.

2. An electronic timepiece comprising:
  a hollow casing;
  an electronic L.E.D. module disposed in said casing and including a digital time and date display;
  a glass crystal connected into an open bezel of said casing and covering said module and said display;
  an illuminated image projection separate from and outside of said display and emanating from a top surface of said casing adjacent to and outside of said crystal.

3. An electronic timepiece as set forth in claim 2, wherein said image projection comprises:
  an aperture having the shape of an image and being formed through said casing;
  a transparent or translucent image plug including the shape of said image and fitted into said aperture;
  a separate image L.E.D. on said module in alignment and registry with said aperture wherein said image plug and said image are illuminated thereby.

4. An electronic timepiece comprising:

a casing;

an electronic L.E.D. module disposed in said casing and including a digital time and date display;

a glass crystal connected into an open bezel of said casing and covering said module and said display;

first and second electronically spaced touch command bars each extending around a different portion of a perimeter of said crystal;

said first command bar, when manually touched by a fingertip, causing said module to display current time, said second command bar, when finger touched, causing said module to display the current calendar information.

5. An electronic timepiece as set forth in claim 4, further comprising:

a false command bar connected to or forming a part of said casing and positioned between the spaced ends of each of said command bars;

each said false command bar being sufficiently small such that, when finger touched, causing the finger to simultaneously make contact with the spaced apart end portions of each of said commend bars wherein said module inverts said display for proper observer observation of said display.

6. An electronic timepiece as set forth in claim 5, further comprising:

first and second insulator strips each of which is generally coextensive with said first and second command bar respectively;

each of said insulator strips electronically isolating the corresponding said command bars from said casing and from each other.

7. An electronic timepiece comprising:

a hollow casing;

an electronic L.E.D. module disposed in said casing and including a digital time and date display;

a glass crystal connected into an open bezel of said casing and covering said module and said display;

wherein, by selective finger contact with said casing, said display is oriented for alternate reading from either side of said timepiece;

an illuminated image projection separate from said display and emanating from a top surface of said casing adjacent to said crystal;

first and second electronically spaced touch command bars each extending around a different portion of a perimeter of said crystal;

said first command bar, when manually touched by a fingertip, causing said module to display current time, said second command bar, when finger touched, causing said module to display the current calendar information;

a false command bar or spacer tab connected to or forming a part of said casing and positioned between the spaced ends of each of said command bars;

each said false command bar being sufficiently small such that, when finger touched, causing the finger to simultaneously make contact with the spaced apart end portions of each of said commend bars wherein said module inverts said display for proper observer observation of said display;

each said false command bar being sufficiently small such that, when finger touched, causing the finger to simultaneously make contact with the spaced apart end portions of each of said commend bars wherein said module inverts said display for proper observer observation of said display;

a thin film lamination attached atop a smooth, uninterrupted surface of said module or an inner surface of said crystal, said film selected for color enhancement of said display.

8. An electronic timepiece as set forth in claim 7, wherein:

said crystal is formed of clear sapphire.

9. An electronic timepiece comprising:

a casing;

an electronic L.E.D. module disposed in said casing and including a digital time and date display;

a glass crystal connected into an open bezel of said casing and covering said module and said display;

a touch command bar extending around a portion of a perimeter of said crystal;

said command bar, when manually touched by a fingertip of the user or another person, causing said module to selectively display any and all display information available or current calendar information and setting of any and all functions of said module.

* * * * *